(12) United States Patent
Hadar et al.

(10) Patent No.: US 9,626,526 B2
(45) Date of Patent: *Apr. 18, 2017

(54) TRUSTED PUBLIC INFRASTRUCTURE GRID CLOUD

(75) Inventors: Eitan Hadar, Nesher (IL); Michael Kletskin, Matan (IL); Nir Barak, Karmi Yosef (IL); Amir Jerbi, Givatayim (IL); Yaacov Bezalel, Holon (IL)

(73) Assignee: CA, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/459,593

(22) Filed: Apr. 30, 2012

(65) Prior Publication Data

US 2013/0291052 A1    Oct. 31, 2013

(51) Int. Cl.
| | |
|---|---|
| G06F 17/00 | (2006.01) |
| H04L 29/06 | (2006.01) |
| G06F 21/62 | (2013.01) |
| H04L 29/08 | (2006.01) |

(52) U.S. Cl.
CPC .......... G06F 21/6218 (2013.01); H04L 63/20 (2013.01); H04L 67/10 (2013.01); *G06F 2221/2113* (2013.01)

(58) Field of Classification Search
CPC ............. G06F 11/3447; G06F 11/3495; G06F 21/6218; H04L 67/10

USPC ............... 709/217, 206, 225, 229, 249, 389; 726/1–8; 713/168–174, 182–186, 202

See application file for complete search history.

(56) References Cited

U.S. PATENT DOCUMENTS

| | | | |
|---|---|---|---|
| 8,271,974 B2 * | 9/2012 | Mazhar et al. ............... | 717/177 |
| 8,689,282 B1 * | 4/2014 | Oprea ..................... | H04L 63/20 |
| | | | 726/1 |
| 2011/0072487 A1 * | 3/2011 | Hadar et al. ...................... | 726/1 |
| 2011/0093916 A1 * | 4/2011 | Lang et al. ....................... | 726/1 |
| 2012/0185913 A1 * | 7/2012 | Martinez ................. | G06F 9/455 |
| | | | 726/1 |
| 2012/0198511 A1 * | 8/2012 | Sarferaz ........................... | 726/1 |
| 2013/0097651 A1 * | 4/2013 | Rendahl et al. ................... | 726/1 |
| 2013/0263080 A1 * | 10/2013 | Karnik ..................... | G06F 8/35 |
| | | | 717/104 |

* cited by examiner

*Primary Examiner* — Evans Desrosiers
(74) *Attorney, Agent, or Firm* — Gilliam IP PLLC (57) ABSTRACT

Systems and methods of implementing a secured cloud environment allow for design and instantiation of a security policy at the infrastructure level. An example system may comprise a first module to facilitate selecting at least two cloud computing component templates from a cloud computing component catalog. The system may comprise a second module to facilitate defining a connection between the at least two selected cloud computing component templates. The system may comprise a third module to facilitate assigning a security level and a policy to at least one of the at least two selected cloud computing component templates. The system may comprise a fourth module to facilitate building a cloud computing component blueprint.

18 Claims, 6 Drawing Sheets

TRUSTED PUBLIC INFRASTRUCTURE GRID CLOUD

BACKGROUND

Prior attempts to build cloud grids focus on rapid service enablement, accurate billing, and quality of service. The prior solutions attempt to provide easier ways to design a requested information technology (IT) system, and focus on automation and optimization of the location of the corresponding manager grid. There exists no known prior cloud grid system with a complete security system built into it at the infrastructure level.

BRIEF SUMMARY

Methods and systems help secure a grid cloud by adding security policy instantiation at an infrastructure design stage, among other measures. The infrastructure designed may create a compliance report to demonstrate that the designed infrastructure satisfies a security policy. Access and network separations according to application tiers of a tenant (e.g. user) may be realized. The methods and systems may be used to merge security and infrastructure design to increase trust and security in cloud systems.

In further embodiments, systems may provide transparency which may include compliance reports on actual usage and access to cloud computing components. Trust between consumers of cloud grid systems and providers may be proven, and based on more than just reputation. In an example embodiment users are segmented to have different access privileges through the use of security policies. Segmentation may also be provided at the application level of a particular user. All segmentation may be within the same grid and may increase efficiency of the cloud grid.

In an example, a designer of a cloud grid selects a cloud grid component and a security policy, including a security level, to be assigned to the component. The security policy choice can be made based on business, architecture, or any other segmentation reason. Cloud grid infrastructure, security, and a security agent may be installed automatically. If an entity (e.g. a person or a balancing system) is attempting to move a cloud grid component, a security policy at the new location of the component can be analyzed and the security policy at the new location can be altered to ensure that proper security for the moved component is maintained.

In an example embodiment a trusted public infrastructure cloud grid may include a system comprising a first module to facilitate selecting at least two cloud computing component templates from a cloud computing component catalog. The system may further comprise a second module to facilitate defining a connection between the at least two selected cloud computing component templates. The system may further comprise a third module to facilitate assigning a security level and a policy to at least one of the at least two selected cloud computing component templates. The system may further comprise a fourth module to facilitate building a cloud computing component blueprint for the connected cloud computing components, wherein the cloud computing component blueprint includes information regarding the security level and policy assigned to the corresponding cloud computing component template, and the cloud computing component blueprint including information regarding the defined connection. The system may further comprise a fifth module to facilitate coupling cloud computing components corresponding to the cloud computing component blueprint to a control server.

In an example embodiment a trusted public infrastructure cloud grid may include a system comprising a secured cloud system design studio, an application manager, and a control server. A secured cloud system design studio may comprise a policy builder that facilitates design of a security policy for a cloud computing component to comply with, a policy importer that facilitates the import of a security policy for a cloud computing component to comply with, and a design studio that facilitates designing secured and non-secured cloud computing components to be deployed in a cloud environment. The design of a secured cloud computing component may include instantiating a security policy that a cloud computing component must comply with, and instantiating a security agent that monitors compliance with the security policy. A security agent ("agent") may send compliance data to a control server, and a cloud computing component catalog. A cloud computing component catalog may include cloud computing component templates that a design studio can use to help facilitate the design of cloud computing components. A cloud computing component template may include a template for a secured cloud computing component. An application manager may comprise a grid deployer that deploys a designed cloud computing component, and a compliance reports module that creates compliance reports. A compliance report may identify compliance status of a deployed, secured cloud computing component. Compliance reports may be created as a function of an instantiated security policy and compliance data. A control server may comprise a policy distributor, wherein the policy distributor receives information regarding changes in an instantiated security policy to be implemented on a cloud computing component and the policy distributor updates the security policy accordingly. A trusted public infrastructure cloud grid may comprise a virtualization environment including a deployed, secured cloud computing component. A deployed, secured cloud computing component may include a security agent that maintains and enforces a security policy to be followed by a deployed, secured cloud computing component. An agent may send cloud computing component compliance information to a control server.

According to an example embodiment a method of creating a trusted public infrastructure cloud grid may comprise selecting at least two cloud computing component templates from a cloud computing component catalog, defining connections between the at least two selected cloud computing component templates, assigning a security level and a policy to at least one of the at least two selected cloud computing component templates, building a cloud computing component blueprint for each selected cloud computing components, and coupling relevant cloud computing components that have a corresponding cloud computing component blueprint to a control server. A cloud computing component blueprint may include information regarding a security level and policy assigned to a corresponding cloud computing component. A cloud computing component blueprint may include information regarding defined connections corresponding to a cloud computing component.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
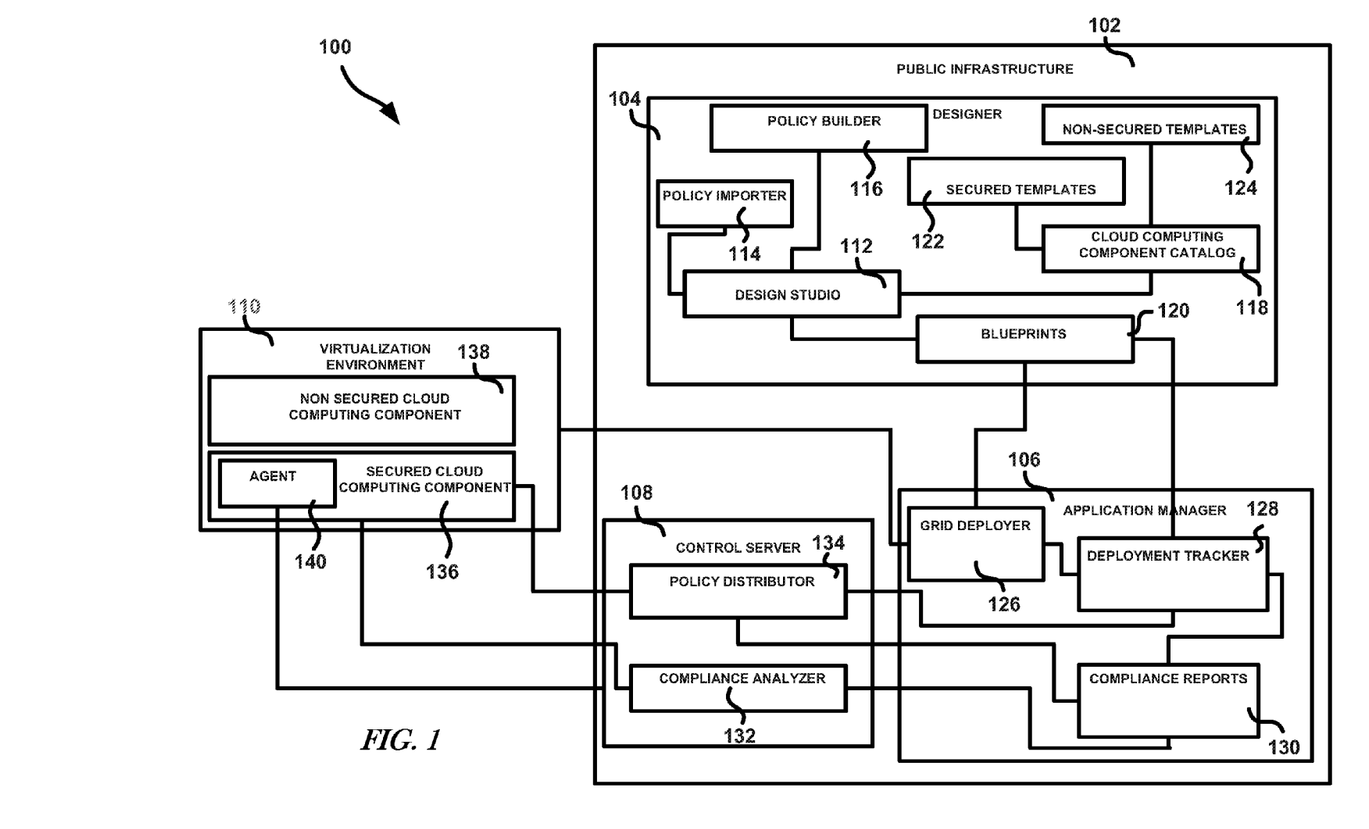
FIG. 1 is a block diagram of a system capable of facilitating the design of secure cloud systems according to an example embodiment.

FIG. 1 depicts a system 100 used to design an at least partially secure cloud computing system. System 100 may include a public infrastructure 102 and a virtualization environment 110. Public infrastructure 102 may include a designer 104, a control server 108, and an application manager 106. Designer 104 may include a design studio 112, a policy importer 114, a policy builder 116, a blueprints module 120, a cloud computing component catalog 118, a secured templates module 122, and a non-secured templates module 124. Application manager 106 may include a grid deployer 126, a deployment tracker 128, and a compliance reports module 130. Control server 108 may include a policy distributor 134 and a compliance analyzer 132. Virtualization environment 110 may include a non-secured cloud computing component module 138 and a secured cloud computing component module 136. Secured cloud computing component module 136 may include an agent 140.

Design studio 112 may be coupled to policy importer 114, policy builder 116, cloud computing component catalog 118, and blueprints module 120 to help facilitate the design of cloud computing components. Design studio 112 allows a user to model both secured and non-secured virtual applications. Virtual applications are designs of cloud grids including a virtual machine, secured or non-secured, and/or other cloud computing components. As used herein, a cloud computing component can be a virtual machine or any other hardware or software related to implementing a cloud grid. A user may interact with design studio 112 through a user interface. The user interface may allow a user to interact through a display and a user input device including but not limited to a keyboard, touchpad, and mouse. The user interface may allow for the drag and drop of virtual computing instruments that represent cloud computing components. Design studio 112 may allow a user to assign security attributes and policies to cloud computing components. Design studio 112 may allow a user to assign policies to cloud computing components. A policy assigned to a specific cloud computing component may be retrieved from policy importer 114. A policy assigned to a specific cloud computing component may be designed using policy builder 116. Design studio 112 may provide an environment to facilitate the selection of cloud computing component templates, selection of virtual datacenter resources, and assignment of security policies to the cloud computing component templates. The security policies may include security attributes to be assigned to a cloud computing component.

As used herein a "security attribute" is a label that may be assigned to a cloud computing component. The security attribute may control which security policies are assigned to a cloud computing component. For example, a security attributes may include "public," "secret," "isolated," or "top secret," among others. A "security policy" (or "policy") associated with security attribute secret or top secret may be "deny access to network unless username, password, and IP address are verified." As used herein "security level" is a numeric representation corresponding to a specific security attribute. A security level may be any number within any range of numbers that allows for a sufficient number of security attributes, and combinations of security attributes, to be defined. A security level may define how secure a cloud computing component is. A security level may correspond to a single security attribute or a combination of security attributes. In an example a bigger security level number corresponds to a cloud computing component that is to be subject to more stringent security requirements. A cloud computing component may include more than one security attribute.

Policy builder 116 may be used to design a security policy for a cloud computing component that may be deployed in virtualization environment 110. A security policy may become a part of a secured template when building a cloud grid using design studio 112. Adding a security policy to secure a template may be done manually where a user may define a security policy that a specific cloud computing component template should have. Adding a security policy to a template may be done automatically where a user specifies a security level to be attained and a corresponding security policy is added to the template. A secured template is a cloud computing component template that has been assigned a security policy, a security attribute, and/or a security level. A non-secured template is a cloud computing component template that has not been assigned a security policy, security attribute, or security level. Policy builder 116 may facilitate the design of a security policy for a cloud computing component to comply with.

Policy importer 114 is a module that may facilitate an import of a security policy from an external storage device, such as a database. The imported security policy may be added to a cloud computing component template. Policy importer 114 and/or policy builder 116 may store a list of available policies that may be added to cloud computing components. The list stored by policy importer 114 and/or policy builder 116 may be a complete list of all the available security policies that may be added to cloud computing component templates. Policy importer 114 may facilitate the import of a security policy for a cloud computing component to comply with.

Templates corresponding to cloud computing components may be stored in cloud computing component catalog 118. Secured cloud computing component templates may be stored in secured templates module 122. Non-secured cloud computing component templates may be stored in non-secured templates module 124. Cloud computing component catalog 118 may include cloud computing component catalog templates which design studio 112 may use to help facilitate the design of cloud computing components to be deployed.

Blueprints module 120 may store cloud computing component application blueprints created using, in part, design studio 112. Blueprints module 120 may be coupled to application manager 106. Blueprints module 120 may be coupled to grid deployer 126 to facilitate the transfer of data required to deploy an application. Blueprints module 120 may be coupled to deployment tracker 128 so that the location of a deployed application can be tracked. Blueprints stored in blueprints module 120 may be deployment descriptors that can be used by grid deployer 126 to aid in deploying a cloud computing component application. In an example embodiment a deployment descriptor is an extensible markup language (XML) file which contains information including how to deploy a cloud computing component, what security attributes, security policies, and security levels the cloud computing component should have, and how the cloud computing component should be configured and/or connections between them.

As used herein a "template" is a definition of a specific cloud computing component. As used herein a "blueprint" is a combination of any number of definitions of cloud computing components, policies, security attributes, security levels, and connections between them.

Grid deployer 126 is a part of application manager 106. Grid deployer 126 may be coupled to virtualization environment 110 to facilitate the deployment of cloud computing components. Grid deployer 126 may be coupled to deployment tracker 128 to allow for storage of data corresponding to deployed cloud computing components. Grid deployer 126 may use blueprints from blueprints module 120 to deploy a cloud computing component in virtualization environment 110. Grid deployer 126 may deploy a cloud computing component when the virtual environment properties of the cloud computing component are sufficiently defined. Grid deployer 126 may be coupled to blueprints module 120 so that data relevant to deploying an application may be communicated to grid deployer 126. Grid deployer 126 may deploy designed cloud computing components as a function of the data contained in relevant cloud computing component blueprints. Designed cloud computing components may be included in a cloud computing component application which includes a corresponding cloud computing component application blueprint. Grid deployer 126 may request additional information including host name, network settings, or administrator password, etc., before deploying a cloud computing component. Information requested by grid deployer 126 may be dependent on the attributes of the environment in which the cloud computing component is to be deployed. These attributes are called "virtual environment properties" herein.

Deployment tracker 128 may store previously completed cloud computing component application deployments. Deployment tracker 128 may be coupled to control server 108. Deployment tracker 128 may be coupled to policy distributor 134 to facilitate retention of what the current security attributes, security policies, and security level has been assigned to a cloud computing component, if any. Deployment tracker 128 may be coupled to compliance reports module 130 to help facilitate the transfer of data relevant to creating compliance reports. If a security policy has been modified, or the meaning of a security level has been updated, and there are cloud computing components with a corresponding security policy stored in deployment tracker 128, then deployment tracker 128 may send a notice to policy distributor 134. Policy distributor 134 may then update the cloud computing component with a new security policy.

Compliance reports module 130 may create and store compliance reports. Compliance reports may provide compliance status of a deployed cloud computing component. Compliance reports stored in compliance reports module 130 may provide the security status of a deployed cloud computing component. Compliance reports may be created as a function of the assigned security policy and compliance data. Compliance reports may provide an indication as to whether a deployed cloud computing component is up to date with the corresponding security policy defined for the cloud computing component. Compliance reports module 130 may be coupled to control server 108. Compliance reports module 130 may be coupled to compliance analyzer 132 to facilitate the creation of compliance reports. Compliance reports module 130 may be coupled to policy distributor 134 to facilitate communication of data relevant to creating compliance reports.

In an example, compliance status may include different levels of compliance including "compliant," "deviations exist," and "no compliance." Compliance status may be determined by comparing how a deployed cloud computing component should have been configured (e.g. by using a blueprint) and comparing that to the actual configuration of the deployed cloud computing component.

Compliance analyzer 132 may be a part of control server 108. Compliance analyzer 132 may be coupled to virtualization environment 110. Compliance analyzer 132 may be coupled to secured cloud computing component module 136 to facilitate the transfer of data relevant to creating compliance reports. Compliance analyzer 132 may be coupled to agent 140 for at least the same reason. Compliance analyzer 132 may collect compliance information from secured cloud computing component module 136. Information collected by compliance analyzer 132 may be sent from agent 140. Information collected by compliance analyzer 132 may be information relevant to compliance reports created by compliance reports module 130. Compliance information may correspond to a security related event that occurred in virtualization environment 110. The security related event may be a user attempting to access a cloud computing component that the user does not have authorization to access. The security related event may be any activity that attempts to violate the security policy corresponding to a cloud computing component.

Policy distributor 134 may be a part of control server 108. Policy distributor 134 may be coupled to virtualization environment 110 to facilitate the communication of data relevant to implementing and/or updating a security policy on a cloud computing component. Policy distributor 134 may be coupled to secured cloud computing component module 136 to facilitate communication of a security policy that a cloud computing component must comply with. Policy distributor 134 may be coupled to agent 140 for at least the same reason. Policy distributor 134 may be responsible for deploying security policies to the relevant secured cloud computing components. The security policy distributed by policy distributor 134 may be created using policy builder 116 or retrieved using policy importer 114. The security policy distributed by policy distributor 134 may be received from deployment tracker 128. Deployment tracker 128 may determine that a security policy on a deployed cloud computing component may be updated and alert policy distributor 134 as to which cloud computing component may be updated and how the cloud computing component should be updated. Policy distributor 134 may update a security policy on a deployed cloud computing component when an authorized user makes a request to update a security policy on the deployed cloud computing component. An authorized user may be anyone who has been given clearance to update or modify a security level of a deployed cloud computing component. An authorized user may also be anyone who is allowed to modify a blueprint (e.g. a security officer) or anyone who has been given access to change attributes on a specific deployment environment (e.g. an operator), among others. Definitions of who is allowed to be an authorized user may be managed on a given system through the use of user management tasks. Policy distributor 134 may collect compliance information from secured cloud computing component module 136. The information collected from secured cloud computing component module 136 may correspond to the current compliance status of the particular cloud computing component. The information collected from secured cloud computing component module 136 may correspond to deviations from a security policy that may exist, or existed at some time, on a deployed cloud computing component. Deployed cloud computing components include all machines or components deployed in virtualization environment 110. Cloud computing components contained in virtualization environment 110 may include non-secured cloud computing components, secured cloud computing components, and other cloud computing components including network routers, storage devices, firewalls, and load balancers.

Virtualization environment 110 may include a secured cloud computing component module 136 and non-secured cloud computing component module 138. Secured cloud computing component module 136 may include a deployed cloud computing component that has been assigned a security policy. The security policy may be assigned using design studio 112. Non-secured cloud computing component module 138 may include deployed cloud computing components that have not been assigned a security policy. Secured cloud computing component module 136 may contain agent 140. Agent 140 may deploy, maintain, and/or enforce a security policy locally. Agent 140 may be coupled to control server

108 to facilitate communication of data relevant to compliance with a security policy. Each deployed secured cloud computing component may include an agent. Any number of agents may be used to deploy, maintain, and/or enforce a security policy locally on a secured cloud computing component. Agent 140 may send compliance information to control server 108. The compliance information may be relevant to cloud computing component compliance with a security policy. The compliance information may be relevant to compliance reports created by compliance reports module 130.

Figure 2:
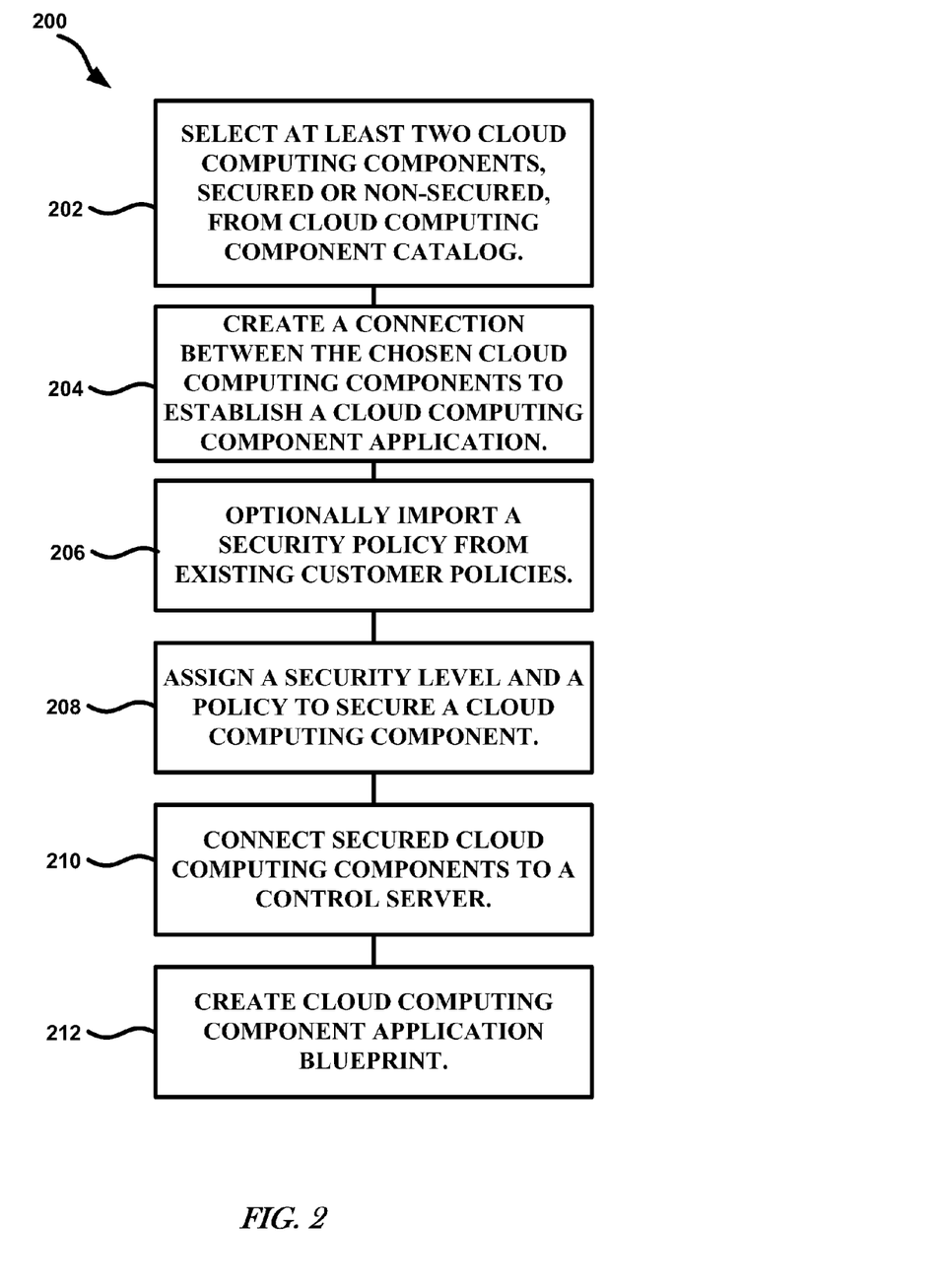
FIG. 2 is a flow diagram of a method of creating a virtual computing environment according to an example embodiment.

FIG. 2 is a flow diagram of a method of creating a secured cloud grid according to an example embodiment. The method 200 begins at 202 with a user selecting cloud computing components (e.g. secured and non-secured cloud computing components). The selection may be facilitated by cloud computing component catalog 118. At 204, the user creates connections between the cloud computing components chosen. The connected cloud computing components may become part of a cloud computing component application.

As used herein a "cloud computing application" is a set of virtual machines and other cloud computing components which provide some kind of service. For example, a "web application" is composed of virtual machines (e.g. an Oracle machine, a web server machine) and other cloud computing components (e.g. router, firewall and storage). In an example a user design of a web application includes dragging and dropping virtual machines and other cloud computing components and specifying the connections between them.

At 206, the user may choose to import security policies from a database of pre-selected security policies. This may be accomplished using policy importer 114. The imported security policies may be received from customers of the user. Alternatively, the user may choose to build their own security policies for a given cloud computing component using policy builder 116. At 208 the user may assign a security level and a policy to cloud computing components that need to be secured. At 210 the user connects secured cloud computing components to a control server. At 212 a cloud computing component application blueprint is created. The cloud computing component application blueprint may be created automatically by design studio 112 or manually through use of design studio 112. The cloud computing component application blueprint may be stored in blueprints module 120.

Figure 3:
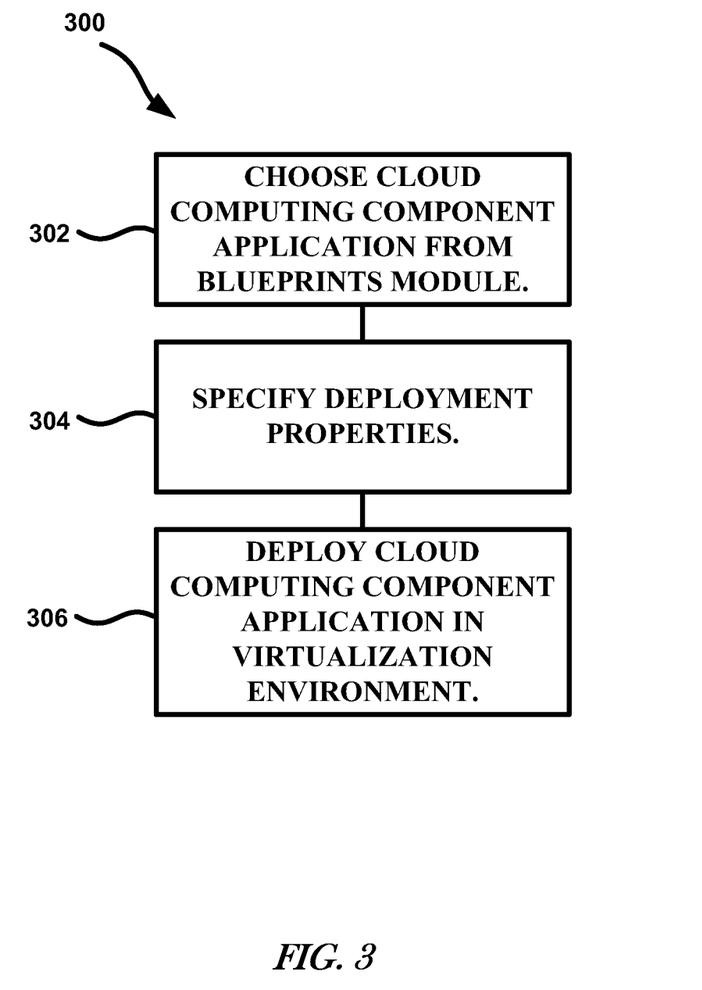
FIG. 3 is a flow diagram of a method of deploying a virtual computing environment according to an example embodiment.

FIG. 3 is a flow diagram of deploying a cloud computing component according to an example embodiment. Method 300 begins with a user choosing a cloud computing component application, at 302. The cloud computing component application may be chosen from blueprints module 120. At 304 deployment properties are specified. The deployment properties may be specified automatically by design studio 112 or manually by a user using design studio 112. At 306 the cloud computing component application is deployed in virtualization environment 110.

Figure 4:
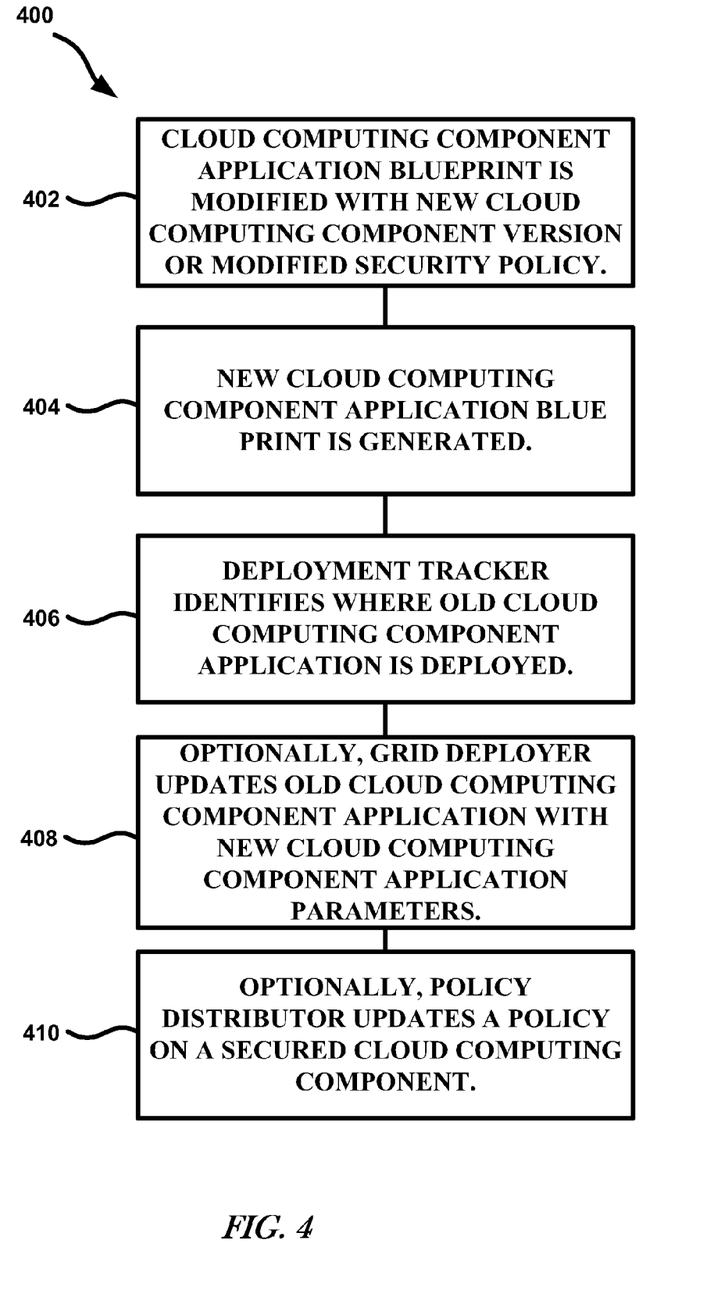
FIG. 4 is a flow diagram of a method of updating a virtual computing environment according to an example embodiment.

FIG. 4 is a flow diagram of updating a security policy or other part of a cloud computing component blueprint according to an example embodiment. Method 400 begins at 402 with a cloud computing component application blueprint being modified with a new cloud computing component version, a modified security policy, or both. At 404 a new cloud computing component application blueprint is generated. The new cloud computing component application blueprint reflects the new cloud computing component version or security policy that is to be implemented. At 406, the location of the cloud computing component application to be updated is identified. The location may be identified by deployment tracker 128. Item 408 is optional. At 408, the cloud computing component application to be updated with new cloud computing component application parameters is updated. The updating may be accomplished using grid deployer 126. The new cloud computing component parameters reflect the new cloud computing component version or modified security policy to be implemented in the cloud computing component application. Item 410 is optional. At 410, security policies on cloud computing components are updated. The updating may be accomplished using policy distributor 134. Updating may include updating the security level corresponding to the cloud computing component.

Figure 5:
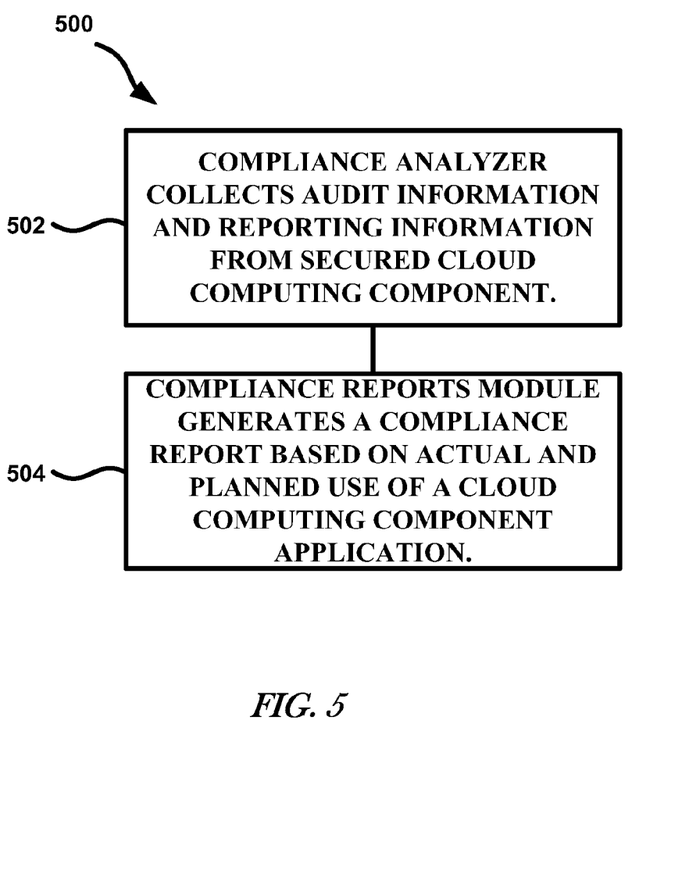
FIG. 5 is a flow diagram of a method of generating compliance reports according to an example embodiment.

FIG. 5 is a flow diagram of creating compliance reports. Method 500 begins at 502 with collecting audit information and reporting the audit information from secured cloud computing components. The collecting may be accomplished using compliance analyzer 132. The audit information may be relevant to security policy compliance. The audit information may regard attempts to violate a security policy. At 504, compliance reports are generated. A compliance report may be based on actual and/or planned use of a relevant cloud computing component. Compliance reports may be generated using compliance reports module 130.

An example method of designing, updating, and generating a compliance report for a virtual cloud environment includes selecting at least two cloud computing component templates from cloud computing component catalog 118. A user may choose to select secured and/or non-secured cloud computing components. After the cloud computing components have been selected, connections between the at least two selected cloud computing component templates may be defined. Security levels and policies may be assigned to the selected cloud computing component templates. The security levels and policies may be imported using policy importer 114 or built using policy builder 116. A cloud computing component blueprint may be defined for selected cloud computing components. The cloud computing component blueprint may include information regarding security levels and policies assigned to the corresponding cloud computing component. The cloud computing component blueprint may also include information regarding the defined connections corresponding to the cloud computing component. Relevant cloud computing components with a corresponding cloud computing component blueprint may then be communicated to control server 108.

Security levels and policies assigned to the selected cloud computing components may be updated. Updating may include generating a modified cloud computing component blueprint, the cloud computing component blueprint altered in accord with a blueprint update corresponding to a modified security policy, or new cloud computing component version, to create the modified cloud computing component blueprint. Updating may include identifying where the cloud computing component to be updated is deployed. Identifying where a cloud computing component has been deployed may be accomplished using deployment tracker 128. A cloud computing component may be updated according to the altered cloud computing component blueprint. Updating the cloud computing component may be accomplished using policy distributor 134 or grid deployer 126. Audit and reporting information regarding secured cloud computing component compliance with security policies may be collected, and compliance reports generated as a function of actual and/or planned use of the secured cloud computing components and the security levels and policies assigned to the cloud computing component templates.

In an example embodiment a compliance report may include a list of applications and the corresponding compliance status of the applications in the list. In an example embodiment a user can use filters to help review compliance reports. For example a user can use a filter to view only those applications which have an outstanding security deviation. In another example a user can use a filter to view only those applications which have a specific security attribute. In an example embodiment a compliance report may show what security is missing on a specific cloud computing component that is creating a security deviation. It should be appreciated by one of ordinary skill in the art that many other types of filters may be used to help review security policy compliance of cloud computing components.

Figure 6:
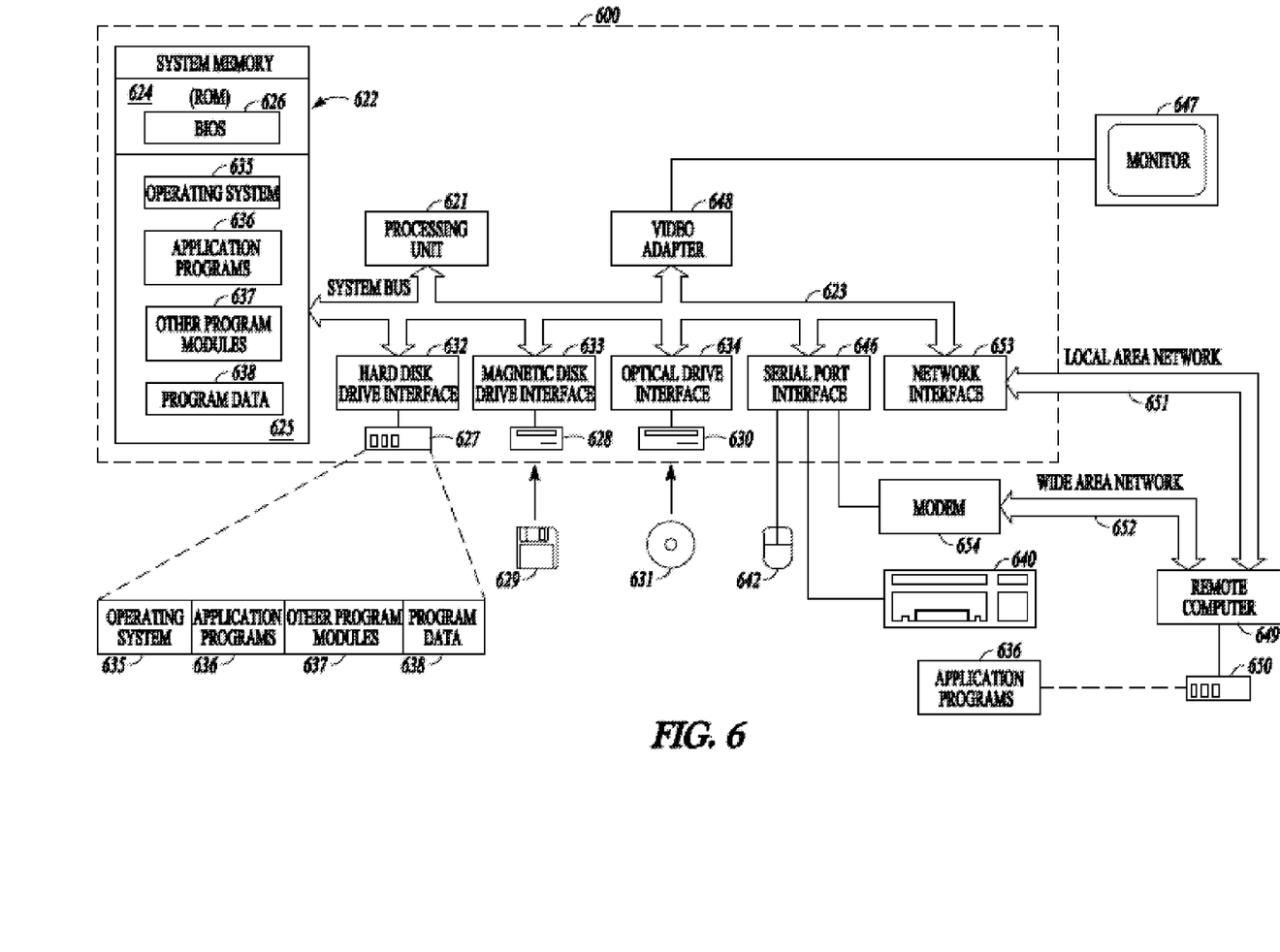
FIG. 6 is a block diagram of a computer system to implement methods according to an example embodiment.

FIG. 6 is a block diagram of a computer system to implement methods according to an example embodiment. In the embodiment shown in FIG. 6, a hardware and operating environment is provided that is applicable to any of the servers and/or remote clients shown in the other Figures.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application policy, and any other electronic media through any suitable switches, routers, outlets and power lines, as the same are known and understood by one of ordinary skill in the art.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A system comprising:
 a processor;
 a memory having computer readable program code, the program code executable by the processor to cause the system to:
  select a plurality of component templates from a cloud computing component catalog, wherein the plurality of component templates represent at least one virtual machine and at least one network element;
  indicate a communication connection between a first component template of the plurality of component templates and a second component template of the plurality of component templates;
  detect a first of a plurality of security levels specified for at least the first component template of the plurality of component templates;
  in response to detection of the first security level, select from a plurality of security policies a first set of one or more security policies that satisfies a first set of one or more security attributes that corresponds to the first security level and lower levels of the plurality of security levels;
  assign the first set of security policies to at least the first component template;
  build a cloud computing application blueprint comprising the plurality of component templates, the first set of security policies, and deployment descriptors expressed in a markup language that indicate configuration of components deployed based on the plurality of component templates including configuration according to the first set of security policies for any of the components deployed based on the first or the second component templates and that indicate configuration of connections between those of the components deployed based on the first and the second component templates according to the communication connection;
  deploy components for the cloud computing application according to the deployment descriptors along with an agent program code to ensure any of the components based on the first component template, any of the components based on the second component template, and connections therebetween comply with the first set of security policies;
  detect a second of the plurality of security levels specified for at least the first component template of the plurality of component templates;
  in response to detection of the second security level and after authentication of a password, select from the plurality of security policies a second set of one or more security policies that satisfies a second set of one or more security attributes that corresponds to the second security level and lower levels of the plurality of security levels;
  update at least the first component template of the plurality of component templates in accordance with the second set of security policies; and
  modify the cloud computing application blueprint, wherein the program code executable by the processor to cause the system to modify the cloud computing application blueprint comprises program code executable by the processor to cause the system to update the deployment descriptors to indicate configuration in accordance with the second set of security policies for any of the components deployed based on the first or the second component templates.

2. The system of claim 1, wherein the second component template is not assigned a security policy.

3. The system of claim 1, wherein the program code executable by the processor to cause the system to assign the first set of security policies to at least the first component template comprises program code executable by the process to cause the system to modify the first component template to comply with the first set of security policies.

4. The system of claim 1, further comprising program code executable by the processor to cause the system to:
 collect audit and reporting information regarding compliance with the first security policy; and
 generate a compliance report based, at least in part, on the collected audit and reporting information.

5. The system of claim 1 further comprising program code executable by the processor cause the system to:
 determine whether the second of the plurality of security levels requires components which are communicatively connected to the components based on the first component template to maintain at least a third of the plurality of security levels, wherein the third security level is less secure than the second security level;
 in response to a determination that the second security level requires components which are communicatively connected to the components based on the first component template to maintain at least the third security level, select from the plurality of security policies a third set of one or more security policies that satisfies a third set of one or more security attributes that corresponds to the third security level and lower levels of the plurality of security levels; and update the second component template in accordance with the third set of security policies;

wherein the program code executable by the processor cause the system to modify the cloud computing application blueprint comprises program code executable by the processor cause the system to update the deployment descriptors to indicate configuration also in accordance with the third set of security policies for any of the components deployed based on the first or the second component templates.

6. The system of claim 1, wherein the program code executable by the processor cause the system to deploy the components for the cloud computing application according to the deployment descriptors comprises program code executable by the processor cause the system to track a deployment location of the components.

7. A method comprising:
selecting a plurality of component templates from a cloud computing component catalog, wherein the plurality of component templates represent at least one virtual machine and at least one network element;
indicating a communication connection between at least a first component template of the plurality of component templates and a second component template of the plurality of component templates;
detecting a first of a plurality of security levels specified for at least the first component template of the plurality of component templates;
in response to detection of the first security level, selecting from a plurality of security policies a first set of one or more security policies that satisfies a first set of one or more security attributes that corresponds to the first security level and lower levels of the plurality of security levels;
assigning the first set of security policies to at least the first component template;
building a cloud computing application blueprint comprising the plurality of component templates, the first set of security policies, and deployment descriptors expressed in a markup language that indicate configuration of components deployed based on the plurality of component templates including configuration according to the first set of security policies for any of the components deployed based on the first or the second component templates and that indicate configuration of connections between those of the components deployed based on the first and the second component templates according to the communication connection;
deploying components for the cloud computing application according to the deployment descriptors along with an agent program code to ensure any of the components based on the first component template, any of the components based on the second component template, and connections therebetween comply with the first set of security policies;
detecting a second of the plurality of security levels specified for at least the first component template of the plurality of component templates;
in response to detection of the second security level and after authentication of a password, selecting from the plurality of security policies a second set of one or more security policies that satisfies a second set of one or more security attributes that corresponds to the second security level and lower levels of the plurality of security levels;
updating at least the first component template of the plurality of component templates in accordance with the second set of security policies; and
modifying the cloud computing application blueprint, wherein modifying the cloud computing application blueprint comprises updating the deployment descriptors to indicate configuration in accordance with the second set of security policies for any of the components deployed based on the first or the second component templates.

8. The method of claim 7, wherein the second component template is not assigned a security policy.

9. The method of claim 7, wherein assigning the first set of security policies to at least the first component template comprises modifying the first component template to comply with the first set security policies.

10. The method of claim 7, further comprising:
collecting audit and reporting information regarding compliance with the first set of security policies; and
generating compliance reports based, at least in part, on the collected audit and reporting information.

11. The method of claim 7 further comprising:
determining that the second of the plurality of security levels requires components which are communicatively connected to the components based on the first component template to maintain at least a third of the plurality of security levels, wherein the third security level is less secure than the second security level;
in response to determining that the second security level requires components which are communicatively connected to the components based on the first component template to maintain at least the third security level, select from the plurality of security policies a third set of one or more security policies that satisfies a third set of one or more security attributes that corresponds to the third security level and lower levels of the plurality of security levels; and
updating the second component template in accordance with the third set of security policies;
wherein modifying the cloud computing application blueprint comprises updating the deployment descriptors to indicate configuration also in accordance with the third set of security policies for any of the components deployed based on the first or the second component templates.

12. The method of claim 7, wherein deploying the components for the cloud computing application according to the deployment descriptors comprises tracking a deployment location of the components.

13. The method of claim 7 further comprising:
in response to detection of the second security level, requesting a password;
wherein selecting from the plurality of security policies the second set of security policies is in response to successful authentication of the password.

14. A computer program product comprising:
a non-transitory computer readable storage medium having computer readable program code embodied therewith, the computer program code comprising program code to:
select a plurality of component templates from a cloud computing component catalog, wherein the plurality of component templates represent at least one virtual machine and at least one network element;

indicate a communication connection between at least a first component template of the plurality of component templates and a second component template of the plurality of component templates;

detect a first of a plurality of security levels specified for at least the first component template of the plurality of component templates;

in response to detection of the first security level, select from a plurality of security policies a first set of one or more security policies that satisfies a first set of one or more security attributes that corresponds to the first security level and lower levels of the plurality of security levels;

assign the first set of security policies to at least the first component template;

build a cloud computing application blueprint comprising the plurality of component templates, the first set of security policies, and deployment descriptors expressed in a markup language that indicate configuration of components deployed based on the plurality of component templates including configuration according to the first set of security policies for any of the components deployed based on the first or the second component templates and that indicate configuration of connections between those of the components deployed based on the first and the second component templates according to the communication connection;

deploy components for the cloud computing application according to the deployment descriptors along with an agent program code to ensure any of the components based on the first component template, any of the components based on the second component template, and connections therebetween comply with the first set of security policies;

detect a second of the plurality of security levels specified for at least the first component template of the plurality of component templates;

in response to detection of the second security level and after authentication of a password, select from the plurality of security policies a second set of one or more security policies that satisfies a second set of one or more security attributes that corresponds to the second security level and lower levels of the plurality of security levels;

update at least the first component template of the plurality of component templates in accordance with the second set of security policies; and modify the cloud computing application blueprint, wherein modifying the cloud computing application blueprint comprises updating the deployment descriptors to indicate configuration in accordance with the second set of security policies for any of the components deployed based on the first or the second component templates.

15. The computer program product of claim 14, wherein the program code to assign the first set of security policies to at least the first component template comprises program code to modify the first component template to comply with the first set of security policies.

16. The computer program product of claim 14 further comprising program code to:
  collect audit and reporting information regarding compliance with the first set of security policies; and
  generate compliance reports based, at least in part, on the collected audit and reporting information.

17. The computer program product of claim 14 further comprising program code to:
  determine whether the second of the plurality of security levels requires components which are communicatively connected to the components based on the first component template to maintain at least a third of the plurality of security levels, wherein the third security level is less secure than the second security level;
  in response to a determination that the second security level requires components which are communicatively connected to the components based on the first component template to maintain at least the third security level, select from the plurality of security policies a third set of one or more security policies that satisfies a third set of one or more security attributes that corresponds to the third security level and lower levels of the plurality of security levels; and
  update the second component template in accordance with the third set of security policies;
  wherein the program code to modify the cloud computing application blueprint comprises program code to update the deployment descriptors to indicate configuration also in accordance with the third set of security policies for any of the components deployed based on the first or the second component templates.

18. The computer program product of claim 14, wherein the program code to deploy the components for the cloud computing application according to the deployment descriptors comprises program code to track a deployment location of the components.

* * * * *